United States Patent
Zhang et al.

(10) Patent No.: US 10,084,347 B2
(45) Date of Patent: Sep. 25, 2018

(54) POWER TRANSMITTER, RESONANCE-TYPE CONTACTLESS POWER SUPPLY AND CONTROL METHOD THEREFOR

(71) Applicant: Silergy Semiconductor Technology (Hangzhou) Ltd., Hangzhou (CN)

(72) Inventors: Wang Zhang, Hangzhou (CN); Feng Yu, Hangzhou (CN)

(73) Assignee: SILERGY SEMICONDUCTOR TECHNOLOGY (HANGZHOU) LTD., Hangzhou (CN)

(*) Notice: Subject to any disclaimer, the term of this patent is extended or adjusted under 35 U.S.C. 154(b) by 118 days.

(21) Appl. No.: 15/080,879

(22) Filed: Mar. 25, 2016

(65) Prior Publication Data

US 2016/0285316 A1    Sep. 29, 2016

(30) Foreign Application Priority Data

Mar. 27, 2015    (CN) .......................... 2015 1 0141174

(51) Int. Cl.
*H01F 27/00*    (2006.01)
*H01F 37/00*    (2006.01)
(Continued)

(52) U.S. Cl.
CPC .............. *H02J 50/12* (2016.02); *H02J 50/80* (2016.02)

(58) Field of Classification Search
CPC .. H02J 50/10; H02J 50/12; H02J 50/70; H02J 50/80; H02J 50/90; H02J 7/02; H02J 7/022; H02J 7/025; H02J 7/04; H02J 7/041
(Continued)

(56) References Cited

U.S. PATENT DOCUMENTS 9,225,241 B2    12/2015  Lee
2014/0152118 A1*   6/2014  Kim .................... H01F 27/2847
                                                         307/104
(Continued)

FOREIGN PATENT DOCUMENTS

CN    201742175 U    2/2011
CN    103840663 A    6/2014
(Continued)

OTHER PUBLICATIONS

Office Action for Chinese Patent Application No. 201510141174.4, dated May 30, 2016, 8 pages.

*Primary Examiner* — Lincoln Donovan
*Assistant Examiner* — Diana J Cheng
(74) *Attorney, Agent, or Firm* — Westman, Champlin & Koehler, P.A.

(57) ABSTRACT

The present disclosure relates to a power transmitter, a resonance-type contactless power supply and a control method. The resonance-type contactless power supply adjusts a phase difference of an inverter control signal in a current cycle in a manner the same as that in a previous cycle in a case that a power parameter in the current cycle and that in the previous cycle satisfy a predetermined relationship, and adjusts the phase difference of the inverter control signal in the current cycle in a manner opposite to that in the previous cycle in a case that the power parameter in the current cycle and that in the previous cycle don't satisfy the predetermined relationship. The power parameter represents system efficiency. Thus, a suitable input current or voltage of the transmitter-side resonant circuit is determined by scanning actually, so that the system can operate at optimal efficiency.

9 Claims, 4 Drawing Sheets

(51) Int. Cl.
*H01F 38/00* (2006.01)
*H02J 50/12* (2016.01)
*H02J 50/80* (2016.01)

(58) Field of Classification Search
USPC .......................................... 307/104; 320/108
See application file for complete search history.

(56) References Cited

U.S. PATENT DOCUMENTS

2014/0354073 A1* 12/2014 Sadakata ................. H02J 17/00
307/104
2015/0364927 A1 12/2015 Yu et al.

FOREIGN PATENT DOCUMENTS

| CN | 104009555 A | 8/2014 |
| CN | 104079076 A | 10/2014 |
| CN | 104701998 A | 6/2015 |
| CN | 104701999 A | 6/2015 |

* cited by examiner

US 10,084,347 B2

POWER TRANSMITTER, RESONANCE-TYPE CONTACTLESS POWER SUPPLY AND CONTROL METHOD THEREFOR

CLAIM OF PRIORITY

This application claims priority to Chinese Application No. 201510141174.4, filed on Mar. 27, 2015, which is hereby incorporated by reference.

BACKGROUND OF THE DISCLOSURE

The present disclosure relates to the field of power electronics, and more particularly, to a power transmitter, a resonance-type contactless power supply and a control method thereof.

FIELD OF THE DISCLOSURE

Contactless power supply is widely used in electronic products, especially in low-power electronic products such as cellular phones, MP3 players, digital cameras, laptop computers, and the like, due to their convenience and availability. A conventional resonance-type contactless power supply typically has a resonance and magnetic coupling circuit including a transmitting coil L1 and a receiving coil L2. The transmitting coil L1 and other components in a power transmitter constitute a transmitter-side resonant circuit. The receiving coil L2 and other components in a power receiver constitute a receiver-side resonant circuit. Electric energy is transferred in a contactless manner when the transmitter-side resonant circuit and the receiver-side resonant circuit have the same resonance frequency. The receiver-side resonant circuit is coupled to the transmitter-side resonant circuit by electromagnetic field, and thus resonates when the transmitter-side resonant circuit resonates. Typically, the above resonance frequency is referred to as a self-inductance resonance frequency.

However, there may be varied load when electric energy is supplied. The conventional contactless power supplies cannot maintain system efficiency while the load varies.

BRIEF DESCRIPTION OF THE DISCLOSURE

In view of this, the disclosure provides a power transmitter, a resonance-type contactless power supply and a control method. The resonance-type contactless power supply adjusts an output voltage or an output current of the power receiver by regulating current or voltage values of the transmitter-side resonant circuit on basis of the power parameter so as to adjust an equivalent load impedance and control the system to operate at optimal efficiency.

According to the first aspect, there is provided a resonance-type contactless power supply comprising:

an inverter configured to receive electric energy and output an AC current with a self-inductance resonance frequency;

a transmitter-side resonant circuit comprising a transmitting coil for transmitting electric energy;

a receiver-side resonant circuit comprising a receiving coil which is separated from but electrically coupled to the transmitting coil in a contactless manner, and configured to receive electric energy from the transmitting coil;

a rectifier circuit being electrically coupled to the receiver-side resonant circuit for converting an AC current from the receiver-side resonant circuit to a DC current; and a control circuit configured to adjust a phase difference of the inverter control signal in a current cycle in a manner the same as that in a previous cycle in a case that a power parameter in the current cycle and that in the previous cycle satisfy a predetermined relationship, or adjust the phase difference of the inverter control signal in the current cycle in a manner opposite to that in the previous cycle in a case that the power parameter in the current cycle and that in the previous cycle don't satisfy the predetermined relationship, wherein the power parameter represents a difference between an input power of the inverter circuit and an output power of the rectifier circuit, or a ratio of the input power of the inverter circuit to the output power of the rectifier circuit.

Preferably, the control circuit comprises:

a receiver-side control circuit configured to detect an output voltage and an output current of the rectifier circuit, to obtain a first parameter representing the output power, and to transfer the first parameter in a contactless manner;

a transmitter-side control circuit configured to detect an input voltage and an input current of the inverter circuit, to obtain a second parameter representing the input power, to receive the first parameter, to calculate the power parameter using the first parameter and the second parameter, and to adjust a phase difference of the inverter control signal in accordance with the power parameter.

Preferably, the receiver-side control circuit comprises:

a first current detection circuit configured to detect an output current of the rectifier circuit and to obtain a first signal representing the output current;

a first voltage detection circuit configured to detect an output voltage of the rectifier circuit and to obtain a second signal representing the output voltage;

a first power calculating circuit configured to obtain the first parameter using the first signal and the second signal;

a first wireless communication circuit configured to transfer the first parameter wirelessly.

Preferably, the transmitter-side control circuit comprises:

a second current detection circuit configured to detect an input current of the inverter circuit and to obtain a third signal representing the input current;

a second voltage detection circuit configured to detect an input voltage of the inverter circuit and to obtain a fourth signal representing the input voltage;

a second power calculating circuit configured to calculate the second parameter using the third signal and the fourth signal;

a second wireless communication circuit configured to receive the first parameter;

an efficiency tracking circuit configured to calculate the power parameter using the first parameter and the second parameter, and to adjust a compensation signal in a current cycle in a manner the same as that in a previous cycle in a case that the power parameter in the current cycle is smaller than or equal to that in the previous cycle and to adjust the compensation signal in the current cycle in a manner opposite to that in the previous cycle in a case that the power parameter in the current cycle is larger than that in the previous cycle; and an inverter signal generating circuit configured to generate the inverter control signal in accordance with the compensation signal.

Preferably, the efficiency tracking circuit adjusts the compensation signal by a predetermined step size.

Preferably, the inverter signal generating circuit comprises:

a comparator configured to compare the compensation signal with a triangular wave signal, and to generate a pulse-width modulation signal; and a phase shift control circuit configured to provide the inverter control signal with a phase difference responding to the pulse-width modulation signal.

According to the second aspect, there is provided a power transmitter being coupled to a power receiver comprising a receiving coil in a contactless manner and configured to provide electric energy, comprising:

an inverter circuit configured to receive electric energy and output an AC current with a self-inductance resonance frequency in accordance with an inverter control signal;

a transmitter-side resonant circuit comprising a transmitting coil which is coupled to the receiving coil in a contactless manner and configured to transmit electric energy;

a transmitter-side control circuit configured to adjust a phase difference of the inverter control signal in a current cycle in a manner the same as that in a previous cycle in a case that a power parameter in the current cycle and that in the previous cycle satisfy a predetermined condition, or opposite to that in the previous cycle in a case that the power parameter in the current cycle and that in the previous cycle don't satisfy the predetermined condition, wherein the power parameter represents a difference between input power of the inverter circuit and output power of the power receiver, or a ratio of input power of the inverter circuit to output power of the power receiver.

Preferably, the transmitter-side control circuit detects an input voltage and input current of the inverter circuit, obtains a second parameter representing the input power, receives a first parameter representing the output power wirelessly, calculates the power parameter using the first parameter and the second parameter, and adjusts a phase difference of the inverter control signal in accordance with the power parameter.

Preferably, the transmitter-side control circuit comprises:

a second current detection circuit configured to detect an input current of the inverter circuit and to obtain a third signal representing the input current;

a second voltage detection circuit configured to detect an input voltage of the inverter circuit and to obtain a fourth signal representing the input voltage;

a second power calculating circuit configured to calculate the second parameter using the third signal and the fourth signal;

a second wireless communication circuit configured to receive the first parameter;

an efficiency tracking circuit configured to calculate the power parameter using the first parameter and the second parameter, and to adjust a compensation signal in a current cycle in a manner the same as that in a previous cycle in a case that the power parameter in the current cycle is smaller than or equal to that in the previous cycle, and to adjust the compensation signal in the current cycle in a manner opposite to that in the previous cycle in a case that the power parameter in the current cycle is larger than that in the previous cycle; and an inverter signal generating circuit configured to generate the inverter control signal in accordance with the compensation signal.

Preferably, the efficiency tracking circuit adjusts the compensation signal by a predetermined step size.

Preferably, the inverter signal generating circuit comprises:

a comparator configured to compare the compensation signal with a triangular wave signal, and to generate a pulse-width modulation signal; and a phase shift control circuit configured to provide the inverter control signal with a phase difference responding to the pulse-width modulation signal.

According to the third aspect, there is provided a control method for controlling a resonance-type contactless power supply comprising a power transmitter and a power receiver, comprising:

obtaining a first parameter representing an output power of the power receiver and a second parameter representing an input power of the power transmitter;

calculating a power parameter in a current cycle using the first parameter and the second parameter, wherein the power parameter represents a difference between the second parameter and the first parameter or a ratio of the second parameter to the first parameter; and adjusting a phase difference of the inverter control signal in a current cycle in a manner the same as that in a previous cycle in a case that a power parameter in the current cycle and that in the previous cycle satisfy a predetermined relationship, or in a manner opposite to that in the previous cycle in a case that the power parameter in the current cycle and that in the previous cycle don't satisfy the predetermined relationship.

The resonance-type contactless power supply adjusts a phase difference of the inverter control signal in a current cycle in a manner the same as that in a previous cycle in a case that the power parameter in the current cycle and that in the previous cycle satisfy a predetermined relationship, and adjusts the phase difference of the inverter control signal in the current cycle in a manner opposite to that in the previous cycle in a case that the power parameter in the current cycle and that in the previous cycle don't satisfy the predetermined relationship. Thus, a suitable input current or voltage of the transmitter-side resonant circuit is determined by scanning actually, so that the system can operate at optimal efficiency.

BRIEF DESCRIPTION OF THE DRAWINGS

The above and other objects, advantages and features of the present disclosure will become more fully understood from the detailed description given hereinbelow in connection with the appended drawings, and wherein.

DETAILED DESCRIPTION OF EMBODIMENTS OF THE DISCLOSURE

Reference will now be made in detail to particular embodiments of the disclosure, it will be understood that the scope of the present disclosure is not limited to these embodiments. Furthermore, in the following detailed description of the present invention, numerous specific details are set forth in order to provide a thorough understanding of the present invention. However, it will be readily apparent to one skilled in the art that the present disclosure may be practiced without these specific details. In other instances, well-known methods, procedures, processes, components, and circuits have not been described in detail so as not to unnecessarily obscure aspects of the present invention.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
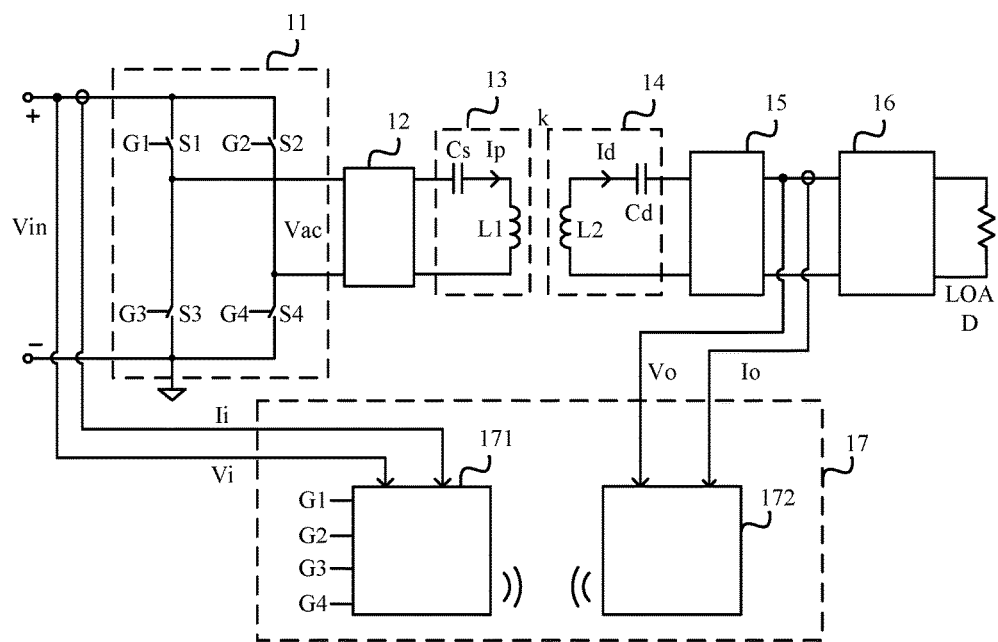
FIG. 1 is a schematic circuit diagram of an example resonance-type contactless power supply according to one embodiment of the present disclosure.

FIG. 1 is a schematic circuit diagram of an example resonance-type contactless power supply according to one embodiment of the present disclosure. As shown in FIG. 1, the resonance-type contactless power supply includes an inverter circuit 11, an impedance conversion network 12, a transmitter-side resonant circuit 13, a receiver-side resonant circuit 14, a rectifier circuit 15 and a DC-DC converter 16 and a control circuit 17.

In the embodiment, the inverter circuit 11, the impedance conversion network 12, the transmitting-side resonant circuit 13 constitute a power transmitter in the resonance-type contactless power supply 1. The receiver-side resonant circuit 14, the rectifier circuit 15 and the DC-DC converter 16 constitute a power receiver in the resonance-type contactless power supply 1. The control circuit 17 includes a transmitter-side control circuit 171 and a receiver-side control circuit 172. The transmitter-side control circuit 171 is one part of the power transmitter, and the receiver-side control circuit 172 is one part of the power receiver.

The power transmitter and the power receiver are separated from but electrically coupled to each other by the transmitter-side resonant circuit 13 and the receiver-side resonant circuit 14 to transfer electric energy.

In the embodiment, the contactless power supply may also be referred to as a wireless power supply. That is, the power transmitter and the power receiver are not limited to a specific mode of power transmission by means of conductor connection for transferring electric energy.

The inverter circuit 11 receives electric energy and provides an AC current Vac with a self-inductance resonance frequency in accordance with an inverter control signal.

The inverting circuit 11 may be a full-bridge inverter circuit, a half-bridge inverter circuit, or other conventional inverter circuits having inverting function.

In FIG. 1, the inverter circuit 11 includes a switching-type full-bridge inverter circuit consisting of a first switch S1, a second switch S2, a third switch S3 and a fourth switch S4. The inverter circuit 11 operates in accordance with the inverter control signals G1 to G4 from the control circuit 17. The inverter control signals G1 to G4 control the switches S1 to S4, respectively. A DC current is converted to an AC current by turning on and off the first switch S1 and the third switch S3 alternatively, and turning on and off the second switch S2 and the fourth switch S4 alternatively. The output AC current has a frequency which is controlled by a switching frequency of the switches S1 to S4. The switches S1, S3, S2 and S4 are controlled so that the switches S1 and S3 are turned on at a phase difference with the switches S2 and S4 to determine a peak value of an AC voltage Vac. Thus, the voltage peak and frequency of the first AC current can be controlled by turning on and off the switches S1 to S4 in accordance with the corresponding inverter control signals.

The impedance conversion network 12 receives the AC current Vac and generates an AC current Ip with a first current peak. The first current peak corresponds to a voltage peak of the AC current Vac. That is, the first current peak is determined by the voltage peak of the AC current Vac. Thus, the transmitter-side resonant circuit 13 receives an AC current Ip with a current peak which is controlled by the inverter control signal. Further, it is equivalent to a circuit in which a constant AC current source is connected to an input port of the transmitter-side resonant circuit 13, and the current peak of the AC current source can be adjusted.

It should be understood that the impedance conversion network 12 is not necessary, and the inverter circuit may be directly coupled to the transmitter-side resonant circuit to output the AC current Vac in other alternative embodiments.

The transmitter-side resonant circuit 13 includes a transmitting coil L1 for receiving the AC current Ip and transmitting electric energy.

The transmitter-side resonant circuit 13 needs an additional transmitter-side resonance capacitor Cs which is connected in series or in parallel with the transmitting coil L1 to provide a resonance circuit. The transmitter-side resonance capacitor Cs is used for balancing inductive reactance of the transmitting coil L1 in the transmitter-side resonant circuit 13, and inductive reactance due to parasitic parameters of the circuit, eliminating voltage spike and surge current at a high frequency due to the parasitic parameters of the circuit, suppressing electromagnetic interference and power supply noise so as to decrease apparent power of the power supply, and increasing power factor of the power supply. Obviously, one skilled in the art can understand that in some cases, distributed capacitance (for example, among wires of the transmitting coil) of the circuit may be used as the transmitter-side resonance capacitor so that an additional capacitor can be omitted in the circuit.

The receiver-side resonant circuit 14 includes a receiving coil L2. The receiving coil L2 is electrically coupled to the transmitting coil L2 in the transmitter-side resonant circuit 13 in a detachable and contactless manner. The receiver-side resonant circuit 13 receives electric energy from the transmitting coil L1.

Meanwhile, the receiver-side resonant circuit 14 needs an additional receiver-side resonant capacitor Cd for decreasing reactive power at a receiver side and increasing active power transferred by the resonance and magnetic coupling circuit. As mentioned above, distributed capacitance (for example, among wires of the coil) of other components in the circuit may be used as the receiver-side resonant capacitor Cd so that an additional capacitor can be omitted in the circuit.

The transmitter-side resonant circuit 13 and the receiver-side resonant circuit 14 constitute the resonance and magnetic coupling circuit.

The rectifier circuit 15 rectifies the third AC current Id which is generated in the receiver-side resonant circuit 14 by the resonance induction, to a DC current.

The DC-DC converter 16 converts the DC current from the rectifier circuit 15 to a constant current or a constant voltage corresponding to load requirements and supplies it to the load LOAD. It should be understood that in some cases, the DC-DC converter 16 is not necessary and the rectifier circuit 15 can be directly coupled to the load.

The DC-DC converter 16 and the load are cascaded to form a cascade circuit which is equivalent to a load RL of the rectifier circuit 15.

Figure 2:
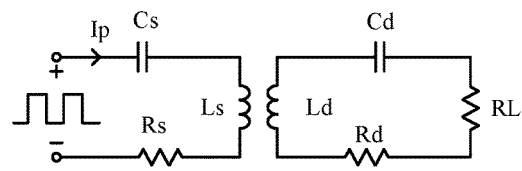
FIG. 2 is an equivalent circuit diagram of a resonance and magnetic coupling circuit in the example resonance-type contactless power supply according to one embodiment of the present disclosure.

FIG. 2 is an equivalent circuit diagram of a resonance and magnetic coupling circuit, i.e. a combination of a transmitter-side resonant circuit 13 and a receiver-side resonant circuit 14, in the example resonance-type contactless power supply according to one embodiment of the present disclosure.

As shown in FIG. 2, the transmitting coil L1 is equivalent to a first ideal coil Ls and a coil resistor Rs, and the receiving coil L2 is equivalent to a second ideal coil Ls and a coil resistor Rd. The first ideal coil Ls is coupled to the second ideal coil Ld. In FIG. 2, the transmitter-side resonant circuit 13 and the receiver-side resonant circuit 14 are each series resonance circuits. The transmitter-side resonant circuit 13 further includes a transmitter-side resonance capacitor Cs, and the receiver-side resonant circuit further includes a receiver-side resonant capacitor Cd. As mentioned above, the transmitter-side resonance capacitor Cs and the receiver-side resonant capacitor Cd may be achieved by additional components or distributed parameters of other components.

Thus, the resonance and magnetic coupling circuit constitutes a mutual-inductance coupling circuit.

Typically, the transmitter-side resonant circuit 13 and the receiver-side resonant circuit 14 have the same resonance frequency so that electric energy can be transferred in a resonant manner as follows, $$fs = 1/2\pi \cdot \sqrt{Ls \cdot Cs} = 1/2\pi \cdot \sqrt{Ld \cdot Cd} = fd$$

wherein fs is a resonance frequency of the transmitter-side resonant circuit 13, fd is a resonance frequency of the receiver-side resonant circuit 14, Ls is an inductance value of the first ideal coil Ls, Ld is an inductance value of the second ideal coil Ld, Cs is a capacitance value of the transmitter-side resonance capacitor, and Cd is a capacitance value of the receiver-side resonant capacitor.

Preferably, the inductance value of the first ideal coil Ls may be set to be equal to the inductance value of the second ideal coil Ld, and the capacitance value Cs of the transmitter-side resonance capacitor may be set to be equal to the capacitance value Cd of the receiver-side resonant capacitor so that the receiver-side resonant capacitor 13 and the receiver-side resonant circuit 14 have the same resonance frequency.

Typically, the above resonance frequency is referred to as a self-inductance resonance frequency. When operating at the above resonance frequency, the transmitter-side resonant capacitor 13 and the receiver-side resonant circuit 14 resonate simultaneously, and impedances of inductors and capacitors in the resonance and magnetic coupling circuit are canceled out. The system efficiency is thus optimized.

Figure 3:
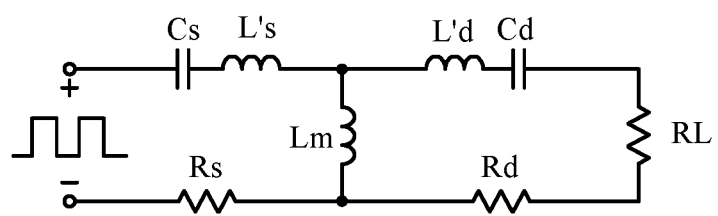
FIG. 3 is an equivalent circuit diagram of a resonance and magnetic coupling circuit in a decoupling state in the example resonance-type contactless power supply according to one embodiment of the present disclosure.

FIG. 3 is an equivalent circuit diagram of a resonance and magnetic coupling circuit in a decoupling state in the example resonance-type contactless power supply according to one embodiment of the present disclosure. As shown in FIG. 3, because coupling of the transmitting coil L1 and the receiving coil L2 includes leakage inductance and mutual inductance, the resonance and magnetic coupling circuit as shown in FIG. 2 can be equivalent to the circuit as shown in FIG. 3, where the ideal coils Ls and Ld are coupled to each other but are represented here by transmitter-side leakage inductance Ls', receiver-side leakage inductance Ld', and mutual inductance Lm. Accordingly, the resonance and magnetic coupling circuit as shown in FIG. 2 may be further equivalent to a two-port network as shown in FIG. 3.

Figure 4:
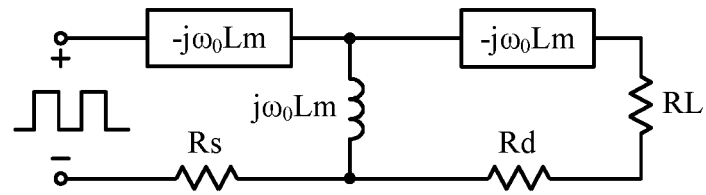
FIG. 4 is a schematic diagram showing parameters of the equivalent circuit in FIG. 3 when operating in a self-inductance resonance frequency.

FIG. 4 is a schematic diagram showing parameters of the equivalent circuit in FIG. 3 when operating in a self-inductance resonance frequency. As shown in FIG. 4, a series circuit of the transmitter-side leakage inductance Ls' and the transmitter-side resonance capacitor Cs has equivalent impedance $-j\omega_0 Lm$ when the transmitter-side resonant circuit 13 provides an AC current Ip with a self-inductance resonance frequency $\omega_0$. Thus, the impedance of the mutual inductance can be canceled out. An input port of the power transmitter has minimized impedance, and the transmitter-side resonant circuit resonates. Meanwhile, a series circuit of the receiver-side leakage inductance Ld' and the receiver-side resonant capacitor Cd has an equivalent impedance $-j\omega_0 Lm$, so that an output port of the power receiver has a minimized impedance, and the receiver-side resonant circuit resonates.

The control circuit 17 in the embodiment adjusts a phase difference of the inverter control signal in a current cycle in a manner the same as that in a previous cycle in a case that a power parameter P(n) in the current cycle and a power parameter P(n−1) in the previous cycle satisfy a predetermined relationship, and adjusts the phase difference of the inverter control signal in a current cycle in a manner opposite to that in the previous cycle in a case that the power parameter P(n) in the current cycle and the power parameter P(n−1) in the previous cycle don't satisfy the predetermined relationship. Thus, the resonance-type contactless power supply operates at optimal efficiency. The power parameter P(i) may either represent a difference between an input power Pi of the inverter circuit 11 and an output power Po of the rectifier circuit 15, i.e., P(i)=f(Pi−Po), or a ratio of the input power Pi to the output power Po, i.e., P(i)=Pi/Po. The power parameter P(i) may decrease or increase as Pi−Po or Pi/Po increases. The corresponding predetermined relationship will be different in different cases. In the embodiment, the predetermined relationship is that the power parameter P(n) in the current cycle is smaller than or equal to the power parameter P(n−1) in the previous cycle if P(i)=Pi−Po or P(i)=Pi/Po. However, it should be understood that the skilled in the art can choose another mathematical equation as the predetermined relationship, such as a relationship in which the power parameter P(n) in the current cycle is smaller than or equal to the power parameter P(n−1) in the previous cycle, if variation trend of P(i) are different from that of Pi−Po or Pi/Po.

Specifically, the control circuit 17 includes a receiver-side control circuit 171 and a transmitter-side control circuit 172.

The receiver-side control circuit 171 detects an output voltage Vo and an output current Io of the rectifier circuit 15, obtains a first parameter P1 representing an output power Po and transfers the first parameter P1 in a contactless manner.

The transmitter-side control circuit 172 detects an input voltage Vi and an input current Ii of the inverter circuit 11, obtains a second parameter P2 representing an input power Pi, receives the first parameter P1, calculates the power parameter P(n) using the first parameter P1 and the second parameter P2, and adjusts phase differences of the inverter control signals G1 to G4 in accordance with the power parameters P(n) and P(n−1).

Figure 5:
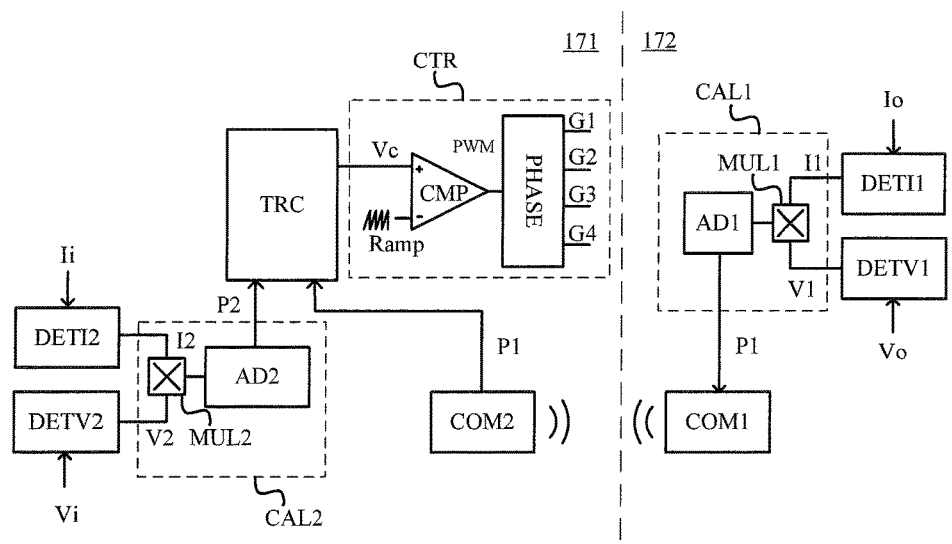
FIG. 5 is a schematic circuit diagram of a control circuit according to one embodiment of the present disclosure.

FIG. 5 is a schematic circuit diagram of a control circuit according to one embodiment of the present disclosure. As shown in FIG. 5, the receiver-side control circuit 171 includes a first current detection circuit DETI1, a first voltage detection circuit DETV1, a first power calculating circuit CAL1 and a first wireless communication circuit COM1.

The first current detection circuit DETI1 detects an output current Io of the rectifier circuit 15, and obtains a first signal I1 representing the output current Io.

The first voltage detection circuit DETV1 detects an output voltage Vo of the rectifier circuit 15 and obtains a second signal V1 representing the output voltage Vo.

It should be understood that the first signal T1 and the second signal V1 may both be current signals or voltage signals, or one is a current signal while the other is a voltage signal. The reference symbols are used for representing the parameters, not for limiting their forms.

The first power calculating circuit CAL1 calculates the first parameter P1 representing the output power Po using the first signal I1 and the second signal V1.

The first parameter P1 can be an analog signal or a digital signal. For example, the first power calculating circuit can be configured to be a multiplication circuit which outputs a product of the first signal I1 and the second signal V1 as the first parameter. Preferably, an analog to digital conversion circuit may be added, which further convert the first signal I1 and the second signal V1 to a first parameter P1 in a digital form for convenient transfer. In the control circuit as shown in FIG. 5, the first power calculating circuit CAL1 includes a multiplication circuit MUL1 and an analog to digital conversion circuit AD1.

A first wireless communication circuit COM1 is used for transferring the first parameter P1 wirelessly. The wireless manner can be radio communication, optical communication or other communication approaches.

The transmitter-side control circuit 172 includes a second current detection circuit DETI2, a second voltage detection circuit DETV2, a second power calculating circuit CAL2, a second wireless communication circuit COM2, an efficiency tracking circuit TRC and a inverter signal generating circuit CTR.

The second current detection circuit DETI2 detects an input current Ii of the inverter circuit 11 and obtains a third signal I2 representing the input current Ii.

The second current detection circuit DETV2 detects an input voltage Vi of the inverter circuit 11 and obtains a fourth signal V2 representing the input voltage Vi.

The second power calculating circuit CAL2 calculates the second parameter P2 using the third signal I2 and the fourth signal V2.

It should be understood that the third signal I2 and the fourth signal V2 may both be current signals or voltage signals, or one is a current signal while the other is a voltage signal. The reference symbols are used for representing the parameters, not for limiting their forms.

The second parameter P2 can be an analog signal or a digital signal. For example, the second power calculating circuit CAL2 can be configured to be a multiplication circuit which outputs a product of the third signal I2 and the fourth signal V2 as the second parameter P2. Preferably, an analog to digital conversion circuit may be added, which further convert the third signal I2 and the fourth signal V2 to a second parameter P2 in a digital form for convenient transfer. In the control circuit as shown in FIG. 5, the second power calculating circuit CAL2 includes a multiplication circuit MUL2 and an analog to digital conversion circuit AD2.

The second wireless communication circuit COM2 is configured to receive a first parameter P1. Consequently, the transmitter-side control circuit obtains the power parameters representing system efficiency in accordance with the first parameter P1 and the second parameter P2.

The efficiency tracking circuit TRC calculates the power parameter P(n) using the first parameter P1 and the second parameter P2, and adjusts a compensation signal Vc in a current cycle in a manner the same as that in a previous cycle in a case that the power parameter P(n) in the current cycle is smaller than or equal to the power parameter P(n−1) in the previous cycle, and in a manner opposite to that in the previous cycle in a case that the power parameter P(n) in the current cycle is larger than the power parameter P(n−1) in the previous cycle;

Specifically, in the embodiment, the efficiency tracking circuit TRC increases or decreases Vc by a predetermined step size ΔV. That is, the compensation signal is increased or decreased by the predetermined step size ΔV in each cycle.

An inverter signal generating circuit CTR generates the inverter control signals G1 to G4 in accordance with the compensation signal Vc. Specifically, the phase differences of the inverter control signals G1 to G4 vary with an increase or decrease in compensation signal Vc. Thus, the phase differences of the inverter control signals G1 to G4 can be adjusted using the power parameter p(n).

Specifically, the inverter signal generating circuit CTR includes a comparator CMP and a phase shift control circuit PHASE.

The comparator CMP compares the compensation signal Vc with a triangular wave signal Ramp, and generates a pulse-width modulation signal PWM.

The phase shift control circuit PHASE provides the inverter control signals G1 to G4 with the phase differences responding to the pulse-width modulation signal PWM.

Figure 6:
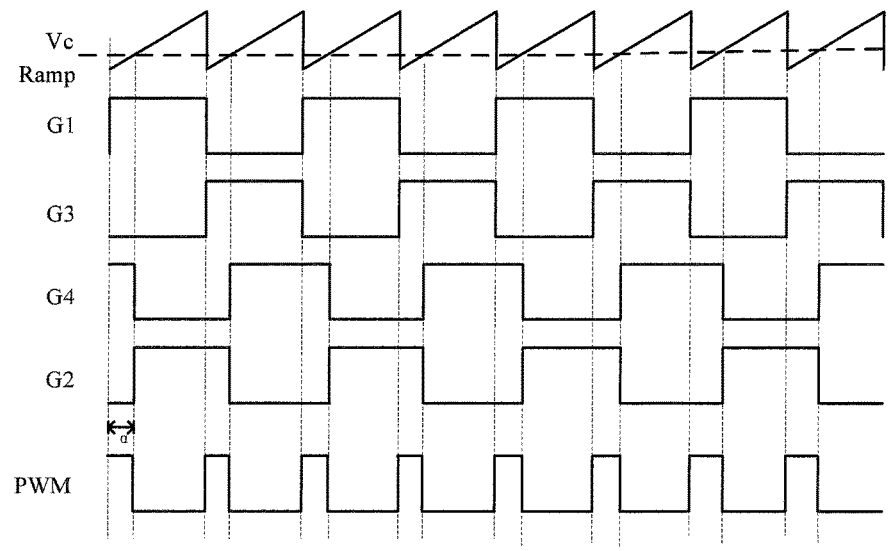
FIG. 6 is an operating waveform diagram of a control circuit according to one embodiment of the present disclosure.

FIG. 6 is an operating waveform diagram of a control circuit according to one embodiment of the present disclosure. As shown in FIG. 6, the phase difference between the inverter control signals G2 and G1, and the phase difference between the inverter control signals G4 and G3 are defined in the current cycle by a high level part of the pulse-width modulation signal. The high level part of the pulse-width modulation signal is determined by a time period during which the triangular wave signal Ramp is smaller than the compensation signal Vc. The inverter control signals with this phase difference control the voltage peak of the AC current of the inverter circuit 11, so that the resonance-type contactless power supply maintains the power parameter close to a minimum value, so that the system operates at optimal efficiency.

Figure 7:
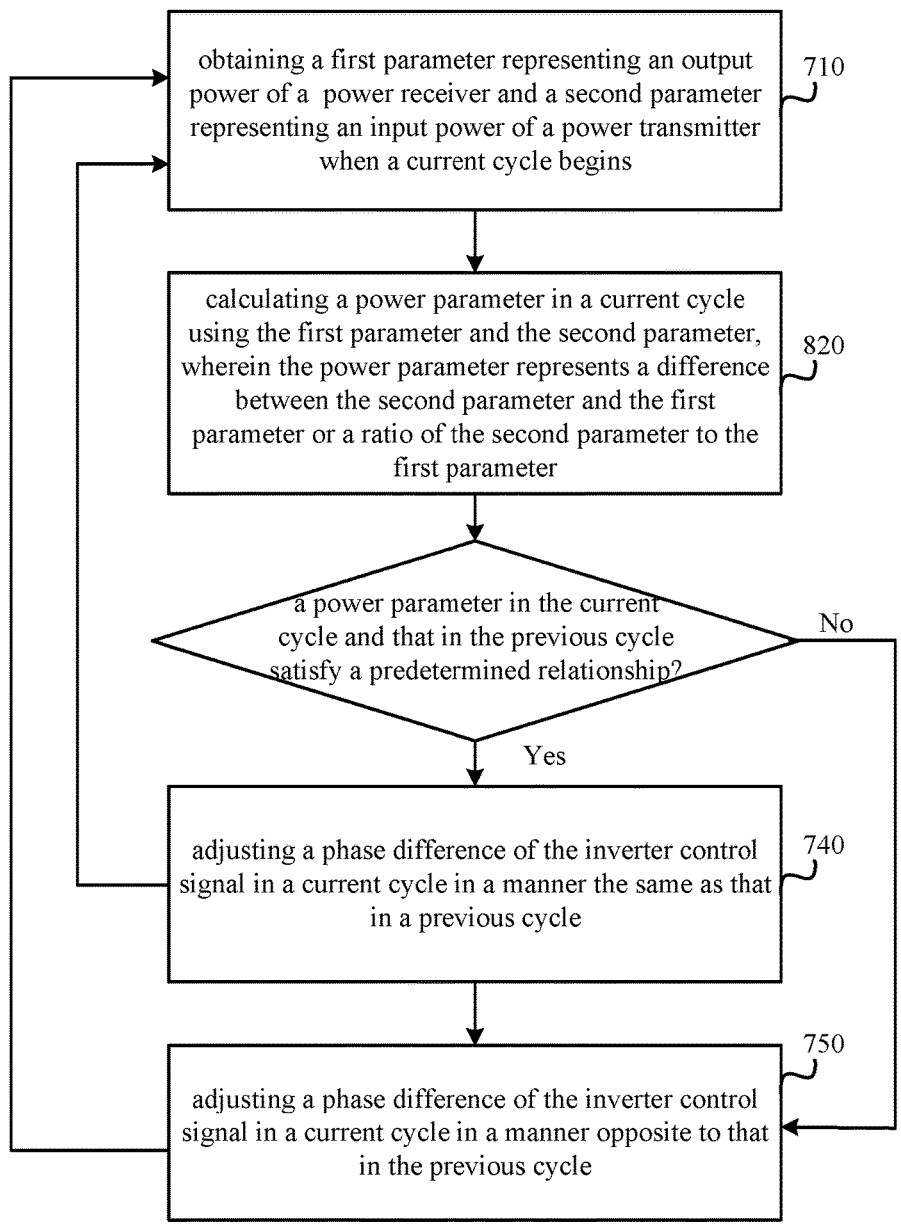
FIG. 7 is a flow chart of an example control method according to one embodiment of the present disclosure.

FIG. 7 is a flow chart of an example control method according to one embodiment of the present disclosure. The controller 17 performs the control method shown in FIG. 7. As shown in FIG. 7, the control method comprises the following steps.

In step 710, a first parameter representing an output power of the power receiver and a second parameter representing an input power of the power transmitter are obtained during a current cycle.

In step 720, a power parameter in the current cycle is calculated using the first parameter and the second parameter, wherein the power parameter represents a difference between the second parameter and the first parameter or a ratio of the second parameter to the first parameter.

In step 730, it is determined whether the power parameter in the current cycle and that in the previous cycle satisfy a predetermined relationship, and if yes, the step 740 will be performed, if no, the step 750 will be performed.

In step 740, the phase difference of the inverter control signal is adjusted in a manner the same as that in the previous cycle and then returns to the step 710.

In step 750, the phase difference of the inverter control signal is adjusted in a manner opposite to that in the previous cycle and then returns to step 710.

Preferably, a predetermined compensation signal Vc may be adjusted for one time and a corresponding power parameter P(0) is obtained before the step 710 for initializing the control method. That is, the first power parameter in the previous cycle is obtained.

Specifically, the control circuit shown in FIG. 5 may increase or decrease the compensation signal by a predetermined step size to indirectly adjust the phase difference of the inverter control signal.

The resonance-type contactless power supply adjusts a phase difference of the inverter control signal in a current cycle in a manner the same as that in a previous cycle in a case that the power parameter in the current cycle and that in the previous cycle satisfy a predetermined relationship, and in a manner opposite to that in the previous cycle in a case that the power parameter in the current cycle and that in the previous cycle don't satisfy the predetermined relationship. The power parameter representing system efficiency to some extent. Thus, a suitable input current or voltage of the transmitter-side resonant circuit is determined by scanning actually, so that the system can operate at optimal efficiency.

The foregoing descriptions of specific embodiments of the present disclosure have been presented, but are not intended to limit the disclosure to the precise forms disclosed. It will be readily apparent to one skilled in the art that many modifications and changes may be made in the present invention. Any modifications, equivalence, variations of the preferred embodiments can be made without departing from the doctrine and spirit of the present invention.

What is claimed is:

1. A resonance-type contactless power supply, comprising:
    an inverter circuit configured to receive electric energy and output an AC current with a self-inductance resonance frequency in accordance with an inverter control signal;
    a transmitter-side resonant circuit comprising a transmitting coil for transmitting electric energy;
    a receiver-side resonant circuit comprising a receiving coil which is separated from but electrically coupled to said transmitting coil in a contactless manner, and configured to receive electric energy from said transmitting coil;
    a rectifier circuit being electrically coupled to said receiver-side resonant circuit for converting an AC current from said receiver-side resonant circuit to a DC current; and
    a control circuit configured to adjust a phase difference of said inverter control signal in a current cycle in a manner the same as that in a previous cycle in a case that a power parameter in said current cycle and that in said previous cycle satisfy a predetermined relationship, and adjust said phase difference of said inverter control signal in said current cycle in a manner opposite to that in said previous cycle in a case that said power parameter in said current cycle and that in said previous cycle don't satisfy said predetermined relationship, wherein said power parameter represents a difference between an input power of said inverter circuit and an output power of said rectifier circuit, or a ratio of said input power of said inverter circuit to said output power of said rectifier circuit,
    wherein said control circuit comprises an inverter signal generating circuit configured to generate said inverter control signal in accordance with a compensation signal,
    said inverter signal generating circuit comprises a comparator configured to compare said compensation signal and a triangular wave signal and to generate a pulse-width modulation signal, and a phase shift control circuit configured to provide said inverter control signal with said phase difference responding to said pulse-width modulation signal.

2. The resonance-type contactless power supply according to claim 1, wherein said control circuit comprise:
    a receiver-side control circuit configured to detect an output voltage and an output current of said rectifier circuit, to obtain a first parameter representing said output power, and to transfer said first parameter in a contactless manner; and
    a transmitter-side control circuit configured to detect an input voltage and an input current of said inverter circuit, to obtain a second parameter representing said input power, to receive said first parameter, to calculate said power parameter using said first parameter and said second parameter, and to adjust said phase difference of said inverter control signal in accordance with said power parameter.

3. The resonance-type contactless power supply according to claim 1, wherein said receiver-side control circuit comprises:
    a first current detection circuit configured to detect an output current of said rectifier circuit and to obtain a first signal representing said output current;
    a first voltage detection circuit configured to detect an output voltage of said rectifier circuit and to obtain a second signal representing said output voltage;
    a first power calculating circuit configured to obtain said first parameter using said first signal and said second signal; and
    a first wireless communication circuit configured to transfer said first parameter wirelessly.

4. The resonance-type contactless power supply according to claim 3, wherein said transmitter-side control circuit comprises:

a second current detection circuit configured to detect an input current of said inverter circuit and to obtain a third signal representing said input current;

a second voltage detection circuit configured to detect an input voltage of said inverter circuit and to obtain a fourth signal representing said input voltage;

a second power calculating circuit configured to calculate said second parameter using said third signal and said fourth signal;

a second wireless communication circuit configured to receive said first parameter; and an efficiency tracking circuit configured to calculate said power parameter using said first parameter and said second parameter, and to adjust said compensation signal in a current cycle in a manner the same as that in a previous cycle in a case that said power parameter in said current cycle is smaller than or equal to that in said previous cycle, and to adjust said compensation signal in said current cycle in a manner opposite to that in said previous cycle in a case that said power parameter in said current cycle is larger than that in said previous cycle.

5. The resonance-type contactless power supply according to claim 4, wherein said efficiency tracking circuit adjusts said compensation signal by a predetermined step size.

6. A power transmitter being coupled to a power receiver comprising a receiving coil in a contactless manner and configured to provide electric energy, comprising:

an inverter circuit configured to receive electric energy and to provide an AC current with a self-inductance resonance frequency in accordance with an inverter control signal;

a transmitter-side resonant circuit comprising a transmitting coil which is coupled to said receiving coil in a contactless manner and configured to transmit electric energy; and a transmitter-side control circuit configured to adjust a phase difference of said inverter control signal in a current cycle in a manner the same as that in a previous cycle in a case that a power parameter in said current cycle and that in said previous cycle satisfy a predetermined condition, and adjust said phase difference of said inverter control signal in said current cycle in a manner opposite to that in said previous cycle in a case that said power parameter in said current cycle and that in said previous cycle don't satisfy said predetermined condition, wherein said power parameter represents a difference between an input power of said inverter circuit and an output power of said power receiver, or a ratio of said input power of said inverter circuit to said output power of said power receiver, wherein said transmitter-side control circuit comprises an inverter signal generating circuit configured to generate said inverter control signal in accordance with a compensation signal, said inverter signal generating circuit comprises a comparator configured to compare said compensation signal and a triangular wave signal and to generate a pulse-width modulation signal, and a phase shift control circuit configured to provide said inverter control signal with said phase difference responding to said pulse-width modulation signal.

7. The power transmitter according to claim 6, wherein said transmitter-side control circuit detects an input voltage and input current of said inverter circuit, obtains a second parameter representing said input power, receives a first parameter representing said output power wirelessly, calculates said power parameter using said first parameter and said second parameter, and adjusts a phase difference of said inverter control signal in accordance with said power parameter.

8. The power transmitter according to claim 7, wherein said transmitter-side control circuit comprises:

a second current detection circuit configured to detect an input current of said inverter circuit and to obtain a third signal representing said input current;

a second voltage detection circuit configured to detect an input voltage of said inverter circuit and to obtain a fourth signal representing said input voltage;

a second power calculating circuit configured to calculate said second parameter using said third signal and said fourth signal;

a second wireless communication circuit configured to receive said first parameter; and an efficiency tracking circuit configured to calculate said power parameter using said first parameter and said second parameter, and to adjust said compensation signal in a current cycle in a manner the same as that in a previous cycle in a case that said power parameter in said current cycle is smaller than or equal to that in said previous cycle, and to adjust said compensation signal in said current cycle in a manner opposite to that in said previous cycle in a case that said power parameter in said current cycle is larger than that in said previous cycle.

9. The power transmitter according to claim 7, wherein said efficiency tracking circuit adjusts said compensation signal by a predetermined step size.

* * * * *